United States Patent
Vogel

(10) Patent No.: US 12,427,617 B2
(45) Date of Patent: Sep. 30, 2025

(54) TOOL FOR MACHINING SURFACES, EDGE REGIONS, AND CONTOURS

(71) Applicant: VOSTECH AG, Lucerne (CH)

(72) Inventor: Josef Vogel, Horw (CH)

(73) Assignee: VOSTECH AG, Lucerne (CH)

( * ) Notice: Subject to any disclaimer, the term of this patent is extended or adjusted under 35 U.S.C. 154(b) by 1348 days.

(21) Appl. No.: 16/479,328

(22) PCT Filed: Nov. 21, 2017

(86) PCT No.: PCT/EP2017/079928
§ 371 (c)(1),
(2) Date: Jul. 19, 2019

(87) PCT Pub. No.: WO2018/133979
PCT Pub. Date: Jul. 26, 2018

(65) Prior Publication Data
US 2019/0337114 A1   Nov. 7, 2019

(30) Foreign Application Priority Data
Jan. 20, 2017 (CH) .................................... 00069/17

(51) Int. Cl.
*B24B 29/00* (2006.01)
*A46B 7/08* (2006.01)
(Continued)

(52) U.S. Cl.
CPC .......... *B24B 29/005* (2013.01); *A46B 13/003* (2013.01); *B24D 13/10* (2013.01); *A46B 7/08* (2013.01); *A46B 2200/3093* (2013.01)

(58) Field of Classification Search
CPC . B24B 29/005; B24B 29/0076; A46B 13/003; A46B 13/02; A46B 7/08;
(Continued)

(56) References Cited

U.S. PATENT DOCUMENTS 1,885,706 A * 11/1932 Frost ..................... A46B 13/003
                                                     15/179
2,000,612 A *  5/1935 Radinse ................... A46B 7/10
                                                    242/118.8
(Continued)

FOREIGN PATENT DOCUMENTS

CH         390869 A     4/1965
CH         419888 A     8/1966
(Continued)

OTHER PUBLICATIONS

DE174826C EspaceNet English Translation (Year: 1905).*
(Continued)

*Primary Examiner* — Makena S Markman
(74) *Attorney, Agent, or Firm* — Rothwell, Figg, Ernst & Manbeck, P.C.

(57) ABSTRACT

A tool for machining surfaces, edge regions, and contours comprising at least one disk-shaped base body rotatable around a tool axis and a plurality of flexible machining means, which are arranged on a circumference of the base body, wherein the machining means are formed rod-shaped and are arranged spaced apart from one another and extend substantially radially outward from the circumference of the base body, wherein at least two disks, between which the machining means are arranged, are arranged in the direction of the tool axis.

9 Claims, 5 Drawing Sheets

(51) Int. Cl.
*A46B 13/00* (2006.01)
*B24D 13/10* (2006.01)

(58) Field of Classification Search
CPC . A46B 7/10; A46B 2200/3093; A46B 13/008; A46B 13/001; B24D 13/10; B24D 13/145; B24D 13/06; B24D 13/04
USPC .................................................. 451/532, 466
See application file for complete search history.

(56) References Cited

U.S. PATENT DOCUMENTS

| | | | | |
|---|---|---|---|---|
| 2,353,125 | A | | 7/1944 | Carpmail |
| 2,866,989 | A | * | 1/1959 | Peterson .............. A46B 13/003 15/198 |
| 3,653,856 | A | * | 4/1972 | Field ...................... B24D 13/06 451/469 |
| 5,207,032 | A | * | 5/1993 | Frymier ................. B24D 13/10 15/181 |
| 5,321,919 | A | * | 6/1994 | Scheider ................ B24D 13/10 15/207.2 |
| 5,329,730 | A | * | 7/1994 | Scheider .................. A46B 3/18 451/469 |
| 5,406,669 | A | * | 4/1995 | Lesiw .................... B24D 13/10 15/198 |
| 5,608,941 | A | * | 3/1997 | Kleinfeld ................ F23J 3/026 15/186 |
| 5,860,179 | A | | 1/1999 | Shipman |
| 5,903,951 | A | * | 5/1999 | Ionta ...................... B29C 45/26 15/198 |
| 6,163,917 | A | | 12/2000 | Bown |
| 7,121,937 | B2 | * | 10/2006 | Turch ....................... A46B 3/04 451/526 |
| 8,425,282 | B2 | * | 4/2013 | Woods .................. B24B 45/003 451/28 |
| 8,469,777 | B2 | * | 6/2013 | Nagafuchi ............ B24D 13/145 451/469 |
| 2003/0092370 | A1 | * | 5/2003 | Lundum ............ B24D 18/0045 451/466 |
| 2014/0366913 | A1 | | 12/2014 | Cho et al. |

FOREIGN PATENT DOCUMENTS

| | | | |
|---|---|---|---|
| DE | 174826 | C * | 7/1905 |
| DE | 296 17 206 | U1 | 12/1996 |
| FR | 1099523 | A | 9/1955 |
| GB | 834598 | A | 5/1960 |
| WO | 2013/125938 | A1 | 8/2013 |

OTHER PUBLICATIONS

International Search Report issued in Application No. PCT/EP2017/079928, dated May 28, 2018.
International Preliminary Report on Patentability and Written Opinion issued in Application No. PCT/EP2017/079928, dated Aug. 1, 2019 (25 pages).

* cited by examiner

TOOL FOR MACHINING SURFACES, EDGE REGIONS, AND CONTOURS

CROSS REFERENCE TO RELATED APPLICATION

This application is a 35 U.S.C. 371 National Phase Entry Application from PCT/EP2017/079928 filed Nov. 21, 2017, which claims priority to Switzerland Patent Application No. 00069/17, filed Jan. 20, 2017, the disclosures of which are incorporated herein in their entirety by reference, and priority is claimed to each of the foregoing.

TECHNICAL AREA OF THE INVENTION

The present invention relates to a tool for machining surfaces, edge regions, and contours comprising a base body rotatable around a tool axis, a plurality of flexible machining means, which are arranged on a circumference of the base body, wherein these machining means are formed rod-shaped and are arranged spaced apart from one another and extend substantially radially outward from the circumference of the base body. Furthermore, the invention relates to a tool receptacle for use with a tool according to the invention, and a method for machining workpieces using a tool according to the invention.

DESCRIPTION OF THE PRIOR ART

Tools for machining surfaces, edge regions, and contours are known from the prior art, in which a plurality of flexible machining means is arranged on the circumference of a base body rotatable around an axis. The flexible machining means are usually formed rod-shaped, are arranged spaced apart from one another, and extend substantially radially outward from the base body. For example, the tool is a brush and the flexible machining means are, for example, bristles, bristle bundles, filaments, or filament bundles.

SUMMARY DESCRIPTION OF THE INVENTION

One object of the present invention is to provide an improved tool for machining surfaces, edge regions, and contours, and a method for the production thereof. Furthermore, an improved tool receptacle for use with the improved tool is to be provided, and also a method for machining workpieces using a tool according to the invention.

A tool having the features of Claim 1 achieves such an object. Further embodiments of the tool, a method for the production thereof, and a tool receptacle for use with such a tool and a method for machining workpieces using a tool according to the invention are defined by the features of further claims.

A tool according to the invention for machining surfaces, edge regions, and contours comprises at least one disk-shaped base body rotatable around a tool axis, having a plurality of flexible machining means. The machining means are formed rod-shaped and are arranged on a circumference of the base body. The machining means are arranged spaced apart from one another and extend substantially radially outward from the circumference of the base body. At least two disks are arranged in the direction of the tool axis, between which the machining means are arranged. The disks have the advantage that the flexible machining means have different yielding properties in different load directions. The flexible machining means are not obstructed in the movement thereof in the peripheral direction by the lateral arrangement of the disks. The movement of the flexible machining means is restricted by the disks transversely to the peripheral direction, in the direction of the tool axis. In the event of force action, the flexible machining means are thus deformable in the peripheral direction substantially over the entire length thereof protruding beyond the circumference of the base body. In the direction of the tool axis, they are deformable substantially over the length which protrudes beyond the disks. The disks therefore have the effect that the flexible machining means are stiff and/or yielding by different degrees in different directions with respect to the tool.

The disk-shaped base body substantially has the shape of a circular disk, through the center of which the tool axis extends.

The flexible machining means are, for example, bristles, bristle bundles, filaments, or filament bundles, wherein a bundle is a group of multiple bristles or filaments arranged with one another.

Flexible machining means indicates that they execute an elastic movement under load and assume substantially the original shape and location thereof upon relief.

The at least two disks, between which the flexible machining means are arranged, substantially have the shape of a circular disk or a circular ring. The length of the flexible machining means which protrudes beyond the disks is thus substantially constant, whereby a constant stiffness of the flexible machining means in the direction of the tool axis results along the circumference of the tool.

Alternatively, the disks can be polygons, for example, having three, four, five, six, or more corners. Therefore, different stiffnesses in the direction of the tool axis along the circumference of the tool also result upon the combination of a base body having a circular disk shape and disks having a polygonal shape.

In one embodiment, the length from the tool axis up to the outermost circumference of the disks defines an outer diameter and the length of the tool axis up to the outermost end of the flexible machining means defines an outer diameter, wherein the outer diameter of the disks is formed smaller than the outer diameter of the flexible machining means.

In a further embodiment, an inner diameter of the disks substantially corresponds to the circumference of the base body. The disks are thus centered with respect to the base body thereby.

In another embodiment, recesses for accommodating the disks are provided on end faces of the base body, wherein an inner diameter of the recesses substantially corresponds to an inner diameter of the disks. The disks are thus centered with respect to the base body thereby. In addition, the recesses permit the design of disk rings having a greater ring depth. Due to the greater depth, a disk is less stiff with respect to a load in the direction of the tool axis than a disk having equal thickness and lesser depth.

The recesses can optionally comprise protrusions, which can engage in corresponding recesses in the disks, whereby twisting of the disks with respect to the base body during use of the tool can be prevented.

In one embodiment, the at least two disks are at least two first disks and at least two second disks, wherein the machining means are arranged between the at least two first disks and wherein the at least two first disks are arranged between the at least two second disks. The use of multiple different disks permits the optimum setting of the stiffness behavior of the flexible machining means in the direction of the tool axis.

In a further embodiment, the outer diameter of the first disks is smaller than, equal to, or larger than the outer diameter of the second disks. This has the advantage that a different stiffness behavior with respect to the deflection of the flexible machining means in the direction of the tool axis may be implemented by a different staggering of the disks. For example, a special increase of the stiffness can be implemented using the increasing deflection of the flexible machining means in the direction of the tool axis. The increase can be, for example, linear, parabolic, hyperbolic, or circular. To achieve this, the staggering of the size of the outer diameters of the disks can be, for example, linear, parabolic, hyperbolic, or circular.

Alternatively or additionally, the thickness of the disks can be changed. The lateral distances in the direction of the tool axis between the flexible machining means and the disks may thus be set. The greater the distance is, the more the flexible machining means have to be deflected in the direction of the tool axis before they come into contact with the disks and can thus influence the stiffness behavior of the flexible machining means.

The stiffness behavior of a disk can be defined by the thickness of the disks. A thin disk is less stiff in the direction of the tool axis than a thick disk of the same material.

In one embodiment, the tool comprises a stack of at least two base bodies arranged adjacent to one another on a common tool axis, wherein the machining means arranged on the circumference of each base body are each arranged between at least two disks. This construction permits the arrangement of an arbitrary number of base bodies, whereby an arbitrary width of the tool is implementable. The width of the tool can thus be adapted to the geometric dimensions of the workpiece to be machined.

The flexible machining means of the respective base body can be aligned flush with one another with respect to the alignment thereof on the circumference or they can be aligned offset in relation to one another. Alternatively, they can not be aligned with one another and can have an arbitrary alignment.

For example, the material of the at least two disks is yielding or stiff and can be selected individually or in combination from the group of metal, plastic, rubber, ceramic, composite material, or paper. This permits a favorable material pairing of the flexible machining means with the disks and of the disks with one another. For example, a material pairing can be selected which results in good sliding properties.

In one embodiment, the at least two disks between the machining means of a base body and the machining means of a base body adjacent thereto are provided at least in a single amount. Two adjacent base bodies and the associated machining means can thus share the disks arranged between them, whereby fewer disks are required and whereby a lesser tool width is implementable.

In an alternative embodiment, the first disks are provided in a multiple amount and the second disks are provided in a single amount. In the case of an identical construction of the individual base bodies comprising machining means and the corresponding disks, for example, in the case of a staggered construction of the disks, the outermost disk can be a plurality of staggered disks, which are associated with a first base body, at the same time the outermost disk can be a plurality of staggered disks, which are associated with a base body adjacent to the first base body. This has the advantage that fewer disks are required, which is more cost-effective, on the one hand, and results in lesser distances between adjacent flexible machining means, on the other hand.

In one embodiment, the base body comprises a through borehole concentric to the tool axis. This permits the simple arrangement of multiple base bodies on a common axis. The individual base bodies may be clamped against one another easily using known clamping elements. For example, an external thread can be provided on the shaft and the base bodies can be clamped against one another using a threaded nut.

A method for producing a tool according to the invention for machining surfaces, edge regions, and contours comprises the following steps:
  providing at least one disk-shaped base body, which is rotatable around a tool axis,
  arranging a plurality of flexible machining means on a circumference of the base body, wherein these machining means are formed rod-shaped and are arranged spaced apart from one another and extend substantially radially outward from the circumference of the base body,
  arranging at least two disks in the direction of the tool axis, between which the machining means are arranged. Such a method is uncomplicated and cost-effective.

In a further embodiment, at least two first disks and at least two second disks are arranged, wherein the machining means are arranged between the at least two first disks and wherein the at least two first disks are arranged between the at least two second disks.

In one embodiment, at least two base bodies are arranged adjacent to one another on the common tool axis, wherein the machining means arranged on the circumference of each base body are each arranged between at least two disks.

In a further embodiment, one second disk is arranged between each two first disks which are associated with two adjacent base bodies.

A workpiece receptacle for use with a tool according to the invention comprises a base body, in which a bearing device and a clamping device are arranged. The bearing device comprises two substantially cylindrical bearing bodies parallel to one another, wherein each of the bearing bodies is rotatable around a corresponding axis of rotation. At least one of the bearing bodies is rotatable by a corresponding drive around the corresponding axis of rotation. The clamping device comprises a clamping belt, which is guided around the two bearing bodies and which can be clamped against the two bearing bodies using a clamping roller, which is mounted so it is rotatable around a clamping axis. The bearing device and the clamping device are designed in such a way that a workpiece to be machined can be arranged in a rotatable manner and clamped between the two bearing bodies and the clamping belt. Due to this construction, the workpiece to be machined is only covered by the clamping belt on one side and is otherwise freely accessible over the entire length. Only this free accessibility permits the use of the tool according to the invention.

In one embodiment, the bearing device furthermore comprises support rollers, which are in contact with the bearing bodies and which can counteract the resulting forces acting on the two bearing bodies, which result from the clamping of the clamping belt against the two bearing bodies. The support rollers prevent the bearing bodies from being deflected out of the original location thereof under load. This is advantageous in the case of long bearing bodies, which are required for long workpieces.

In a further embodiment, the workpiece receptacle is designed as pivotable around at least one pivot axis. A relative angle may thus be set between the workpiece to be machined and the machining tool. The workpiece receptacle can additionally also be designed as displaceable. Alternatively or additionally, the tool can be designed as pivotable. For example, the tool can be arranged on a robot arm.

In a method for machining workpieces using a tool according to the invention, a relative movement takes place during the machining between the tool and the workpiece receptacle in the direction of the tool axis over the entire tool width. This results in more uniform machining of the workpiece and more uniform wear of the tool, and/or of the flexible machining means of the tool.

In one embodiment, the workpiece is rotated in the workpiece receptacle during the machining. An optimum alignment of the surface to be machined, the edge region to be machined, or the contour to be machined with respect to the tool can be achieved by the rotation, which results in optimum machining results.

In a further embodiment, firstly a relative pivot movement is executed between the tool and the workpiece receptacle. This has the advantage that before the contact of the tool with the workpiece, the relative alignment thereof in relation to one another takes place, which results in better machining results.

BRIEF DESCRIPTION OF THE DRAWINGS

Exemplary embodiments of the present invention are explained in greater detail hereafter on the basis of figures. In the figures

DETAILED DESCRIPTION OF THE INVENTION

Figure 1:
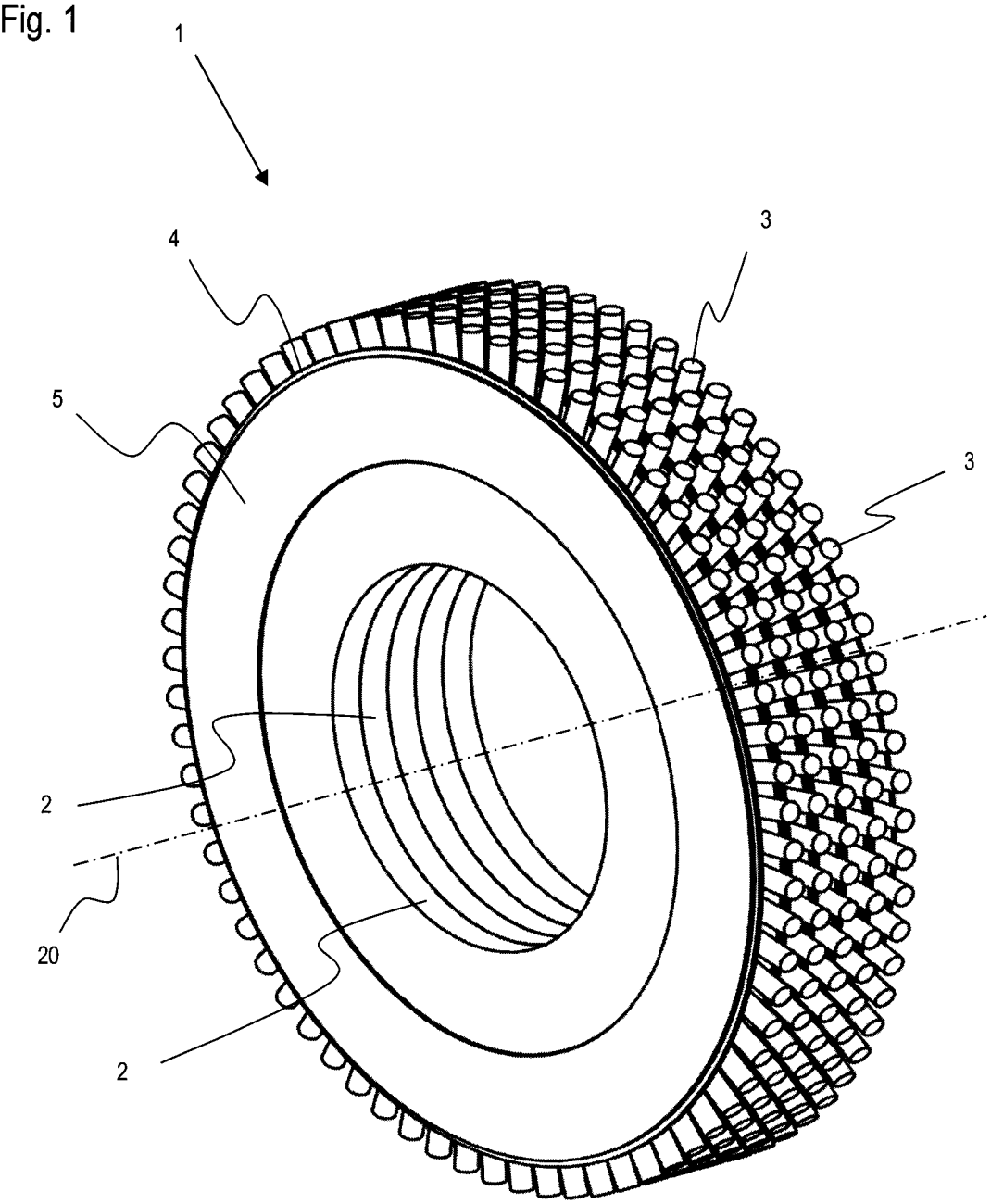
FIG. 1 shows a perspective illustration of an embodiment of a tool according to the invention.

FIG. 1 shows a perspective illustration of an embodiment of a tool 1 according to the invention for machining surfaces, edge regions, and contours comprising multiple disk-shaped base bodies 2 rotatable around a tool axis 20. Each base body 2 has a plurality of flexible machining means 3, which are arranged on the circumference 21 of the respective base body 2. The machining means 3 are formed rod-shaped and are arranged spaced apart from one another and extend substantially radially outward from the circumference 21 of the respective base body 2. At least two disks 4, 5 are arranged in the direction of the tool axis 20, between which the machining means 3 are arranged.

Figure 2:
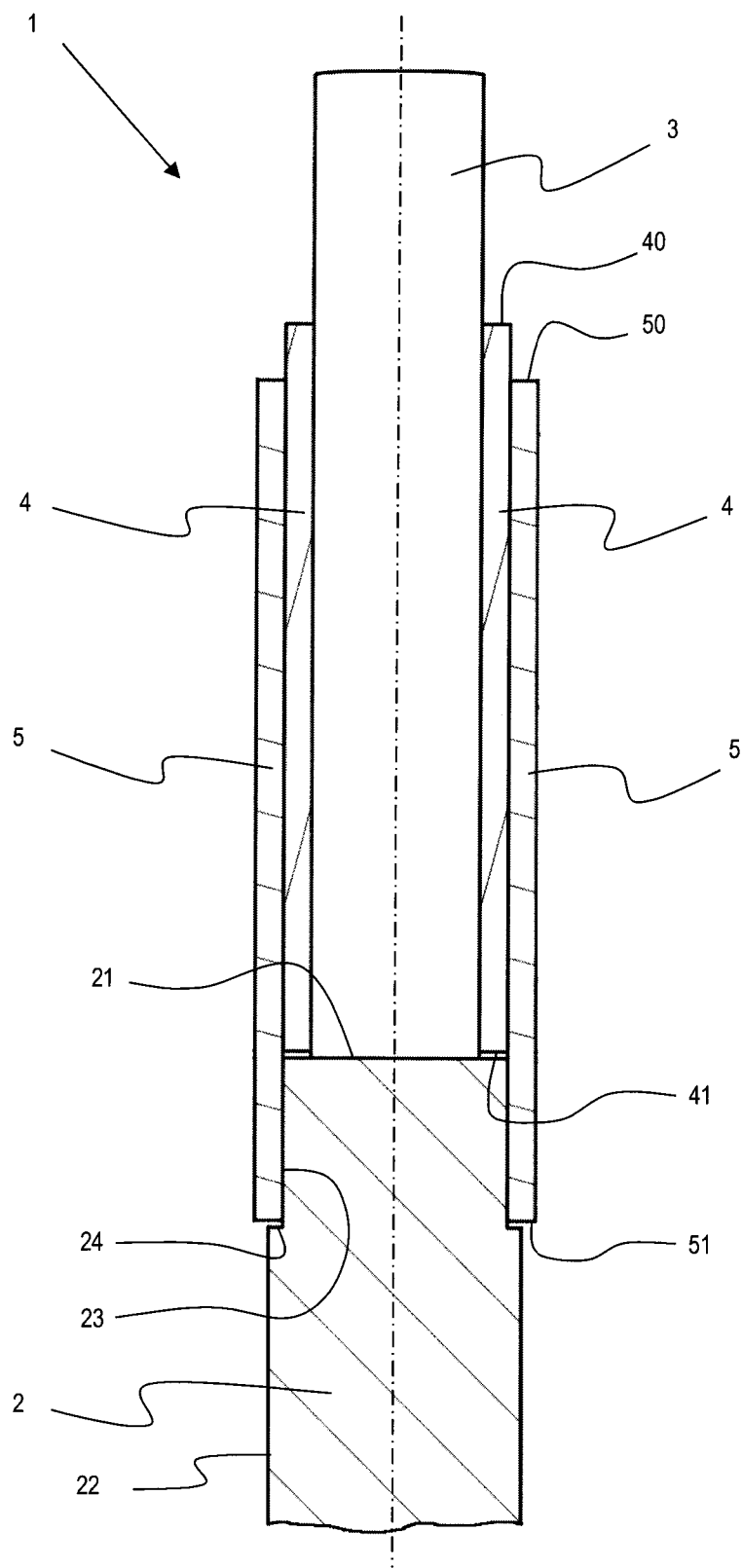
FIG. 2 shows a partial sectional view through a flexible machining means of the tool of FIG. 1.

FIG. 2 shows a partial sectional view through a flexible machining means 3 of the tool 1 of FIG. 1. A first disk 4 is arranged laterally adjacent in each case to the flexible machining means 3, the flexible machining means 3 protruding beyond the outer diameter 40 thereof and the inner diameter 41 of which substantially corresponds to the outer diameter 21 of the base body 2. The base body 2 comprises recesses 23 on its end faces 22. These recesses 23 extend from an inner diameter 24 up to the outer diameter 21 of the base body 2. A second disk 5 is arranged laterally adjacent in each case to the first disks 4, the outer diameter 50 of which is bigger than the outer diameter 40 of the first disks 4 and the inner diameter 51 of which substantially corresponds to the inner diameter 24 of the corresponding recess 23 in the base body 2.

Figure 3:
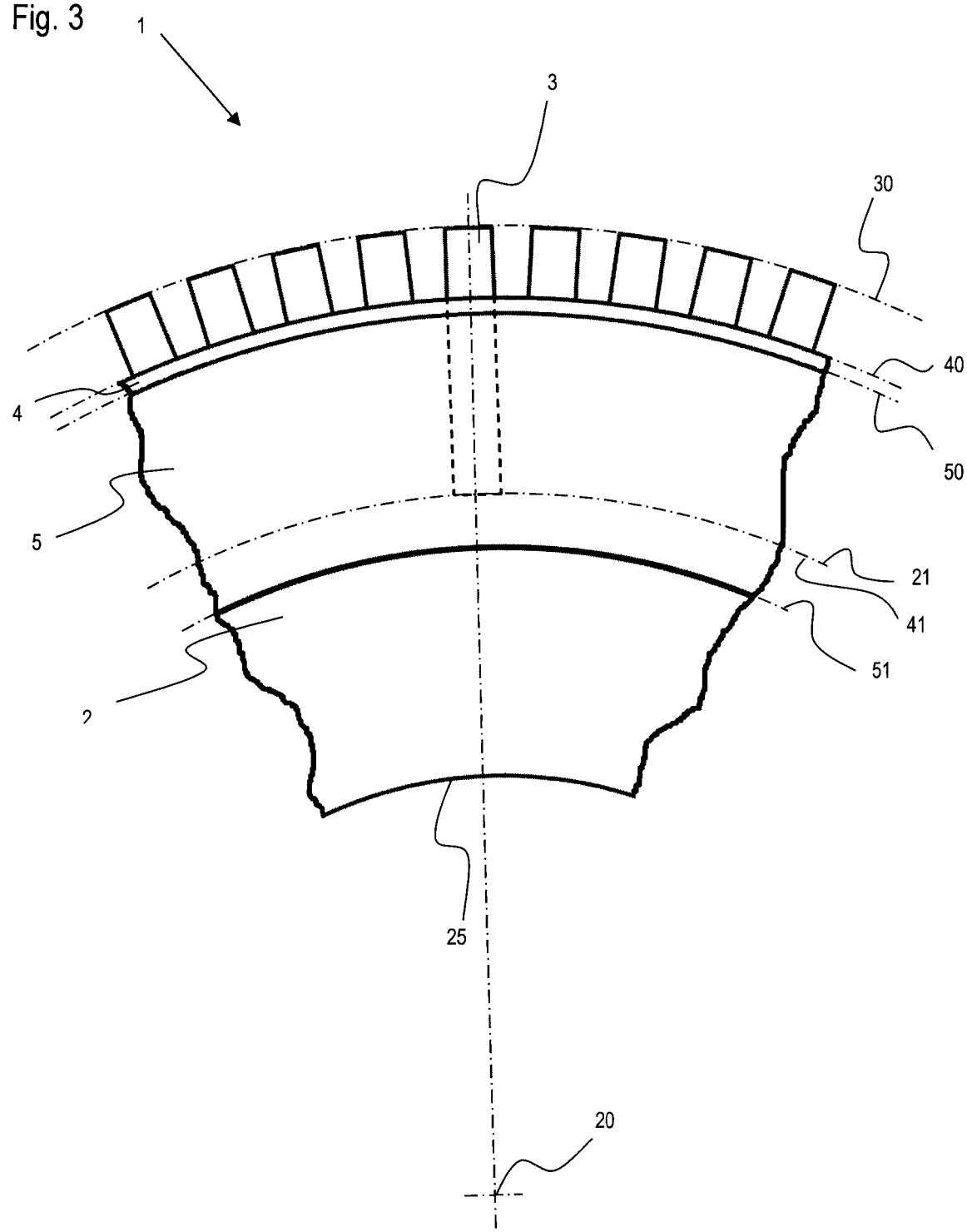
FIG. 3 shows a partial side view of the tool of FIG. 1.

FIG. 3 shows a partial side view of the tool 1 of FIG. 1. The length from the tool axis 20 up to the outermost circumference of the disks 4, 5 defines a respective outer diameter 40, 50. The length from the tool axis 20 up to the outermost end of the flexible machining means 3 defines an outer diameter 30. The outer diameter 40, 50 of the disks 4, 5 is formed smaller than the outer diameter 30 of the flexible machining means 3. The base body 2 is a ring disk having an outer diameter 21 and having an inner diameter 25. The first disks 4 are ring disks having an outer diameter 40 and having an inner diameter 41. The second disks 5 are ring disks having an outer diameter 50 and having an inner diameter 51.

Figure 4:
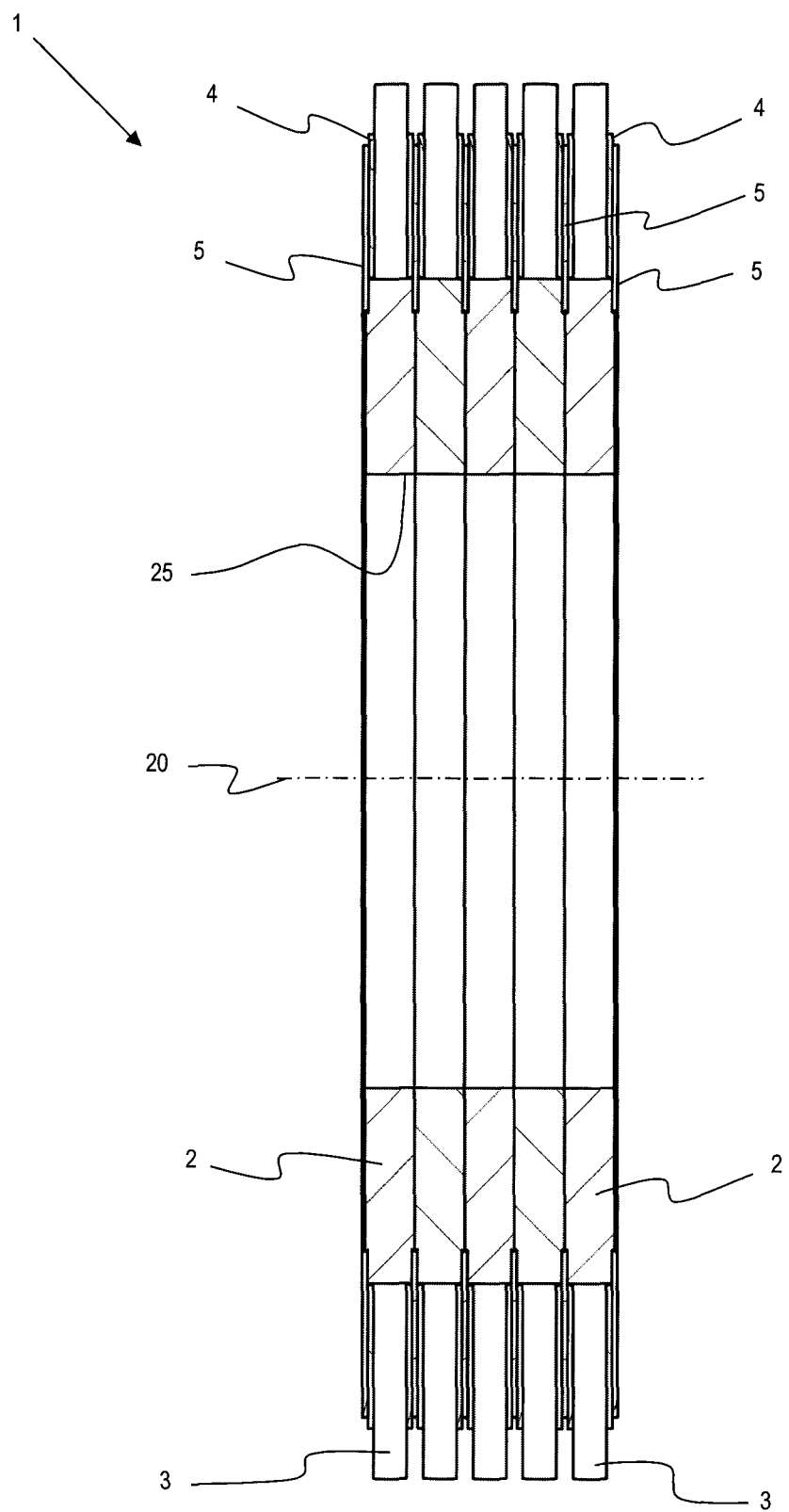
FIG. 4 shows a sectional view through the tool axis of the tool of FIG. 1.

FIG. 4 shows a sectional view through a tool axis 20 of the tool 1 of FIG. 1. The tool 1 comprises a stack of multiple base bodies 2 arranged adjacent to one another on a common tool axis 20. The machining means 3 arranged on the circumference 21 of each base body 2 are each arranged between two first disks 4 and the two first disks 4 are arranged between two second disks 5. The first disks 4 are provided in a multiple amount and the second disks 5 are provided in a single amount. This means the second disks 5, which are associated with a base body 2, are associated at the same time with a base body 2 adjacent to the base body 2. The outermost dimensions of the flexible machining means 3, and the inner diameters 25 of the respective base body 2, are flush with one another in the direction of the tool axis 20.

Figure 5:
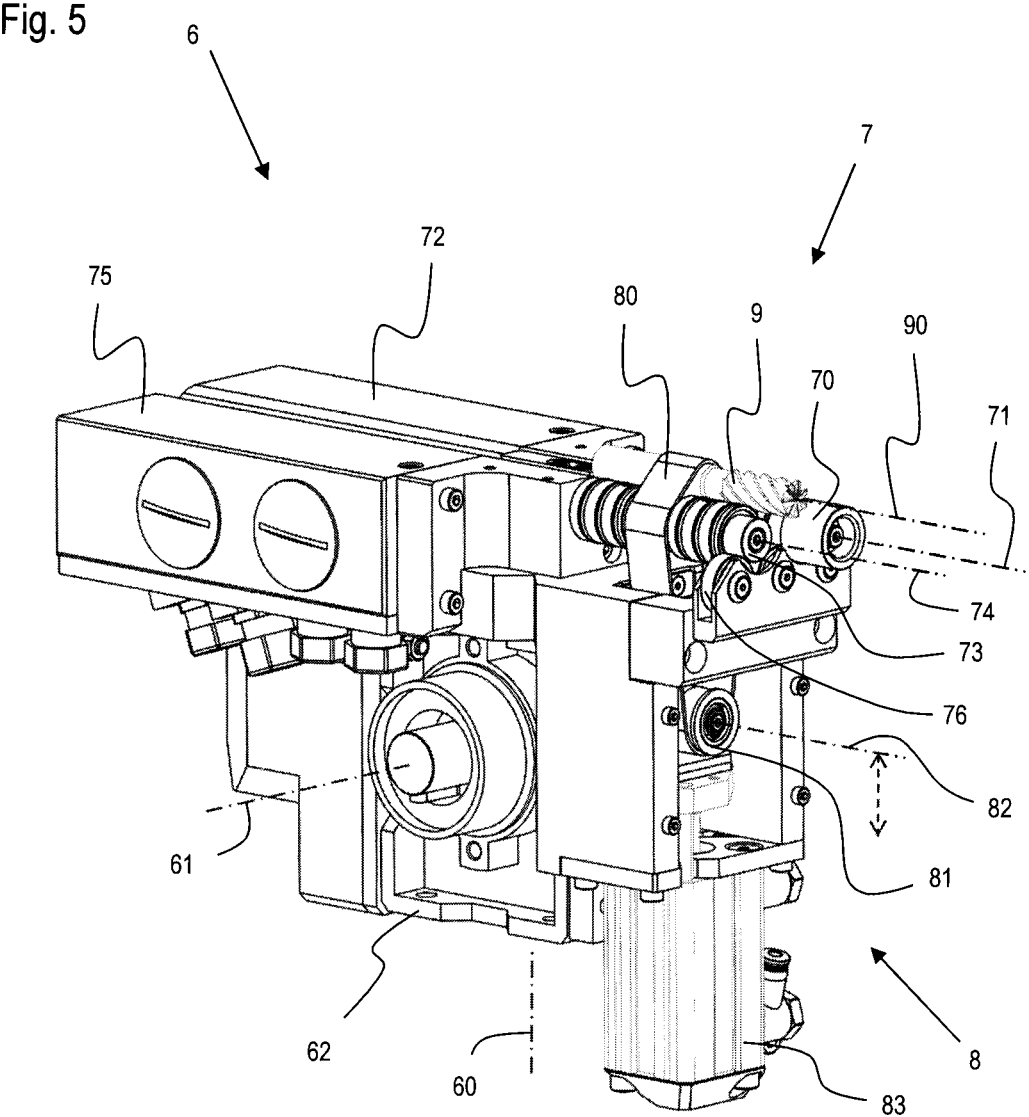
FIG. 5 shows a perspective illustration of a workpiece receptacle for use with a tool according to the invention.

FIG. 5 shows a perspective illustration of a workpiece receptacle 6 for use with a tool according to the invention. The workpiece receptacle 6 comprises a base body 2, on which a bearing device 7 and a clamping device 8 are arranged. The bearing device 7 comprises two substantially cylindrical bearing bodies 70, 73 parallel to one another, wherein each of the bearing bodies 70, 73 is rotatable around a corresponding axis of rotation 71, 74. At least one of the bearing bodies 70, 73 is rotatable around the corresponding axis of rotation 71, 74 by a corresponding drive 72, 75. The clamping device 8 has a clamping belt 80, which is guided around the two bearing bodies 70, 73 and which can be clamped using a clamping roller 81, which is mounted so it is rotatable around a clamping axis 82, against the two bearing bodies 70, 73. The bearing device 7 and the clamping device 8 are designed in such a way that a workpiece 9 to be machined can be arranged so it is rotatable and can be clamped between the two bearing bodies 70, 73 and the clamping belt 80. The clamping roller 81 is movable by means of an actuator 83, whereby a clamping effect can be generated together with the clamping belt 80 and the bearing bodies 70, 73. The bearing device 7 furthermore comprises support rollers 76, which are in contact with the bearing bodies 70, 73 and which can counteract the resulting forces acting on the two bearing bodies 70, 73, which result from the clamping of the clamping belt 80 against the two bearing bodies 70, 73. Three support rollers 76 are shown, wherein the middle of the support rollers 76 can act simultaneously on both bearing bodies 70, 73. The workpiece receptacle 6 comprises a first pivot axis 60 and a second pivot axis 61 perpendicular to the first pivot axis 60, around which the tool receptacle 6 is pivotable.

LIST OF REFERENCE NUMERALS 1 tool
2 base body 20 tool axis
21 circumference
22 end face
23 recess
24 inner diameter
25 through borehole
3 machining means
30 outer diameter
4 first disk
40 outer diameter
41 inner diameter
5 second disk
50 outer diameter
51 inner diameter
6 workpiece receptacle
60 first pivot axis
61 second pivot axis
62 base body
7 bearing device
70 first bearing body
71 first axis of rotation
72 first drive
73 second bearing body
74 second axis of rotation
75 second drive
76 support roller
8 clamping device
80 clamping belt
81 roller
82 clamping axis
83 actuator
9 workpiece
90 workpiece axis

The invention claimed is:

1. A tool for machining surfaces, edge regions, and contours, the tool comprising:
   at least one disk-shaped base body rotatable around a tool axis,
   a plurality of flexible machining means, which are arranged on a circumference of the base body, wherein the machining means are formed rod-shaped, are arranged spaced apart from one another, extend substantially radially outward from the circumference of the base body, and comprise bristles, bristle bundles, filaments, or filament bundles, and
   at least two disks arranged in the direction of the tool axis, wherein the machining means are arranged in an axial direction between and laterally adjacent to the at least two disks such that:
   movement of the machining means is not restricted in a peripheral direction, transversely to the axial direction, by the at least two disks, and thus the machining means are deformable in the peripheral direction substantially over an entire length of the machining means that protrudes beyond the circumference of the base body, and
   movement of the machining means is restricted in the axial direction by the at least two disks, and thus the machining means are deformable in the axial direction substantially over a length of the machining means that protrudes beyond the at least two disks, wherein said length of the machining means that protrudes beyond the at least two disks is significantly shorter than a preceding length of the machining means that does not protrude beyond the at least two disks.

2. The tool according to claim 1, wherein the length from the tool axis up to the outermost circumference of the disks defines an outer diameter and wherein the length from the tool axis up to the outermost end of the flexible machining means defines an outer diameter, wherein the outer diameter of the disks is formed smaller than the outer diameter of the flexible machining means.

3. The tool according to claim 1, wherein an inner diameter of the disks substantially corresponds to the circumference of the base body.

4. The tool according to claim 1, wherein recesses for accommodating the disks are provided on end faces of the base body, wherein an inner diameter of the recesses substantially corresponds to an inner diameter of the disks.

5. The tool according to claim 1, wherein the at least two disks are at least two first disks and at least two second disks, wherein the machining means are arranged between the at least two first disks and wherein the at least two first disks are arranged between the at least two second disks.

6. The tool according to claim 5, wherein the outer diameter of the first disks, is smaller than, equal to, or larger than the outer diameter of the second disks.

7. The tool according to claim 1, wherein the at least one disk-shaped base body comprises a stack of at least two base bodies arranged adjacent to one another on a common tool axis, wherein the machining means arranged on the circumference of each base body are each arranged between at least two disks.

8. The tool according to claim 1, wherein the material of the at least two disks is yielding or stiff and is selected from the group consisting of metal, plastic, rubber, ceramic, composite material, or paper.

9. A method for producing the tool for machining surfaces, edge regions, and contours according to claim 1, the method comprising:
   providing the at least one disk-shaped base body, which is rotatable around the tool axis,
   arranging the plurality of flexible machining means on the circumference of the base body, wherein the machining means are formed rod-shaped and are arranged spaced apart from one another and extend substantially radially outward from the circumference of the base body,
   arranging the at least two disks in the direction of the tool axis, wherein the machining means are arranged between the at least two disks so that the machining means are not obstructed in their movement in a peripheral direction.

* * * * *